March 20, 1956 W. D. CLAUSSEN ET AL 2,738,988
TRACTOR TRAILER SAFETY COUPLING
Filed May 26, 1954 3 Sheets-Sheet 1
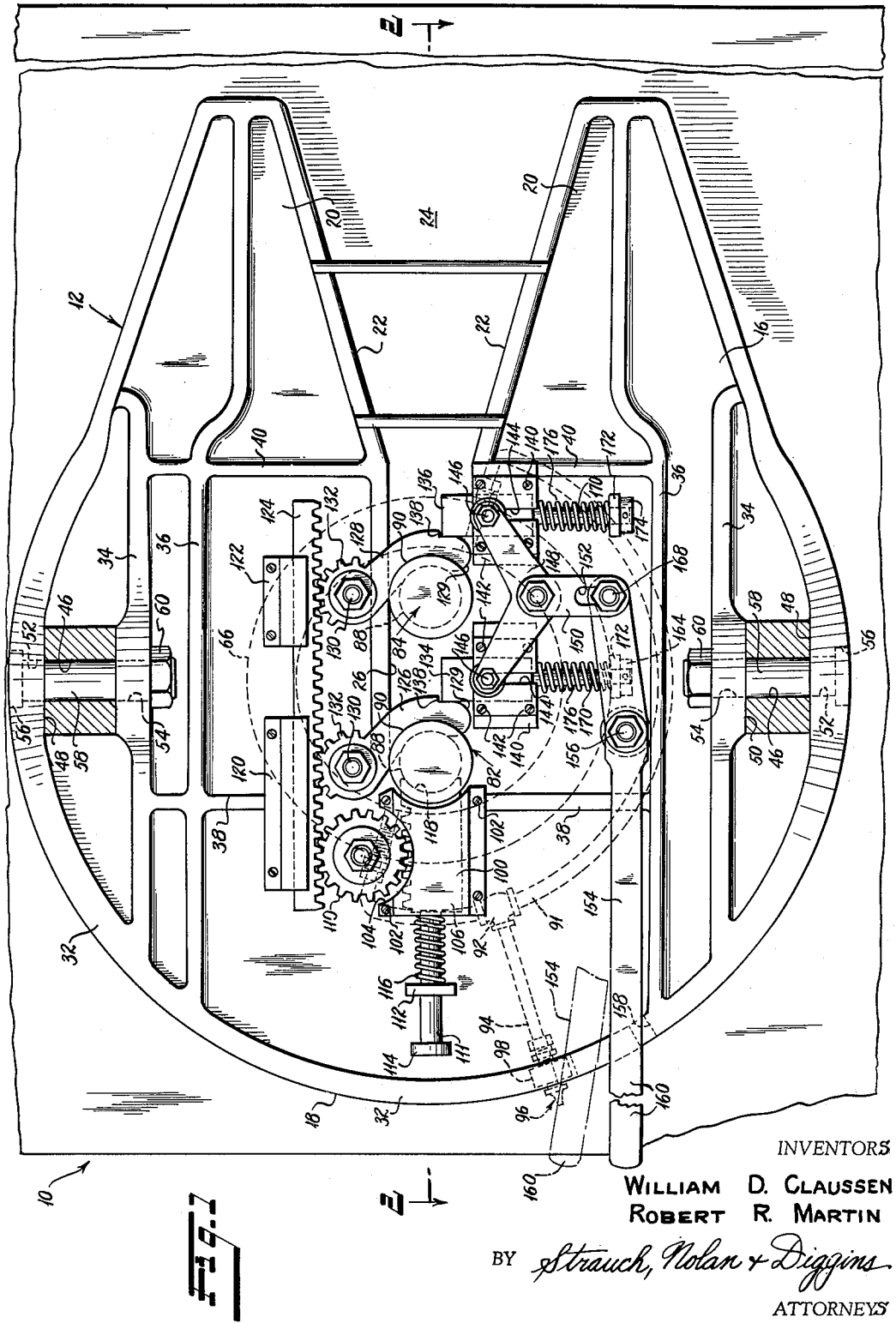
INVENTORS
WILLIAM D. CLAUSSEN
ROBERT R. MARTIN
BY Strauch, Nolan & Diggins
ATTORNEYS

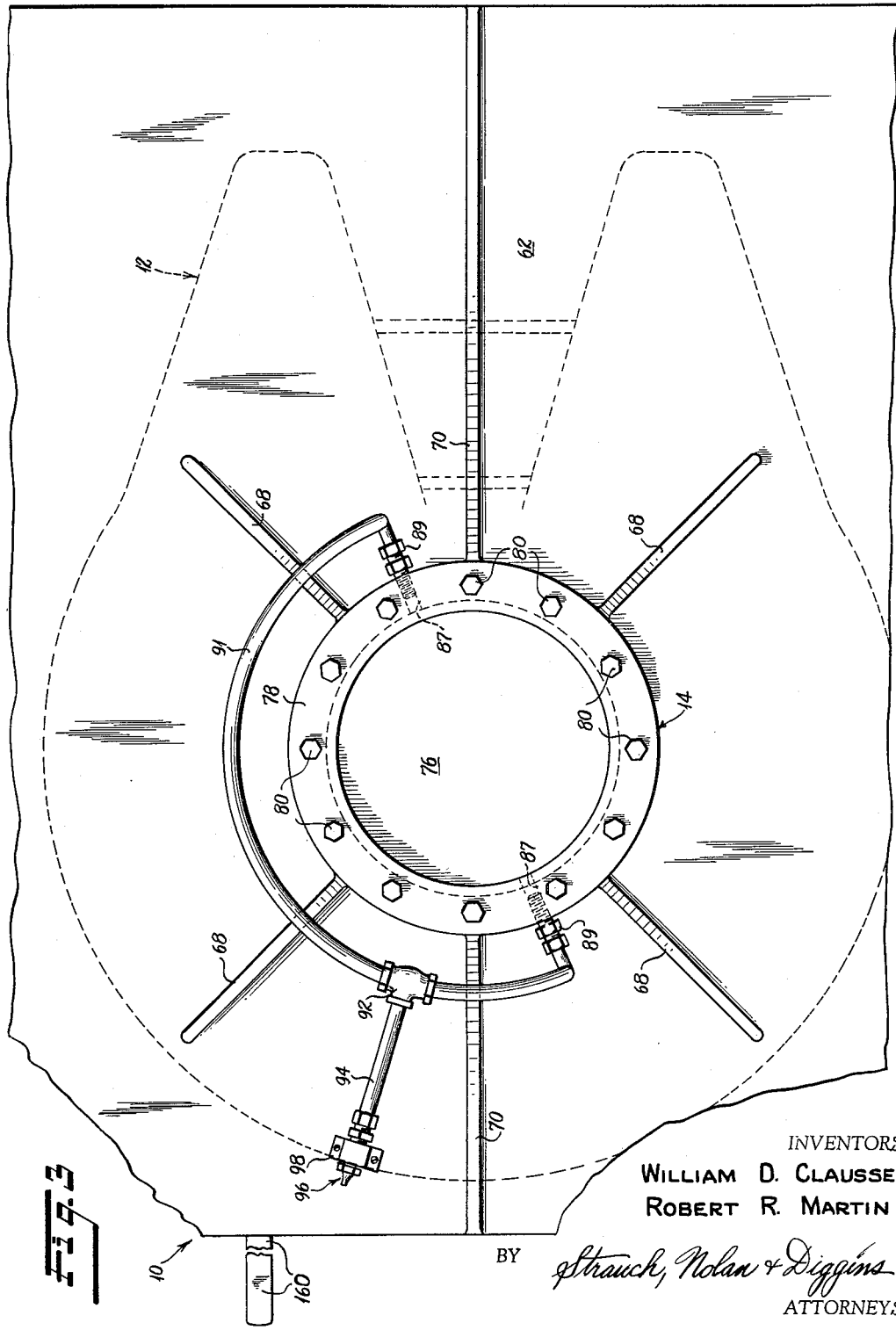

March 20, 1956 W. D. CLAUSSEN ET AL 2,738,988
TRACTOR TRAILER SAFETY COUPLING
Filed May 26, 1954 3 Sheets-Sheet 3
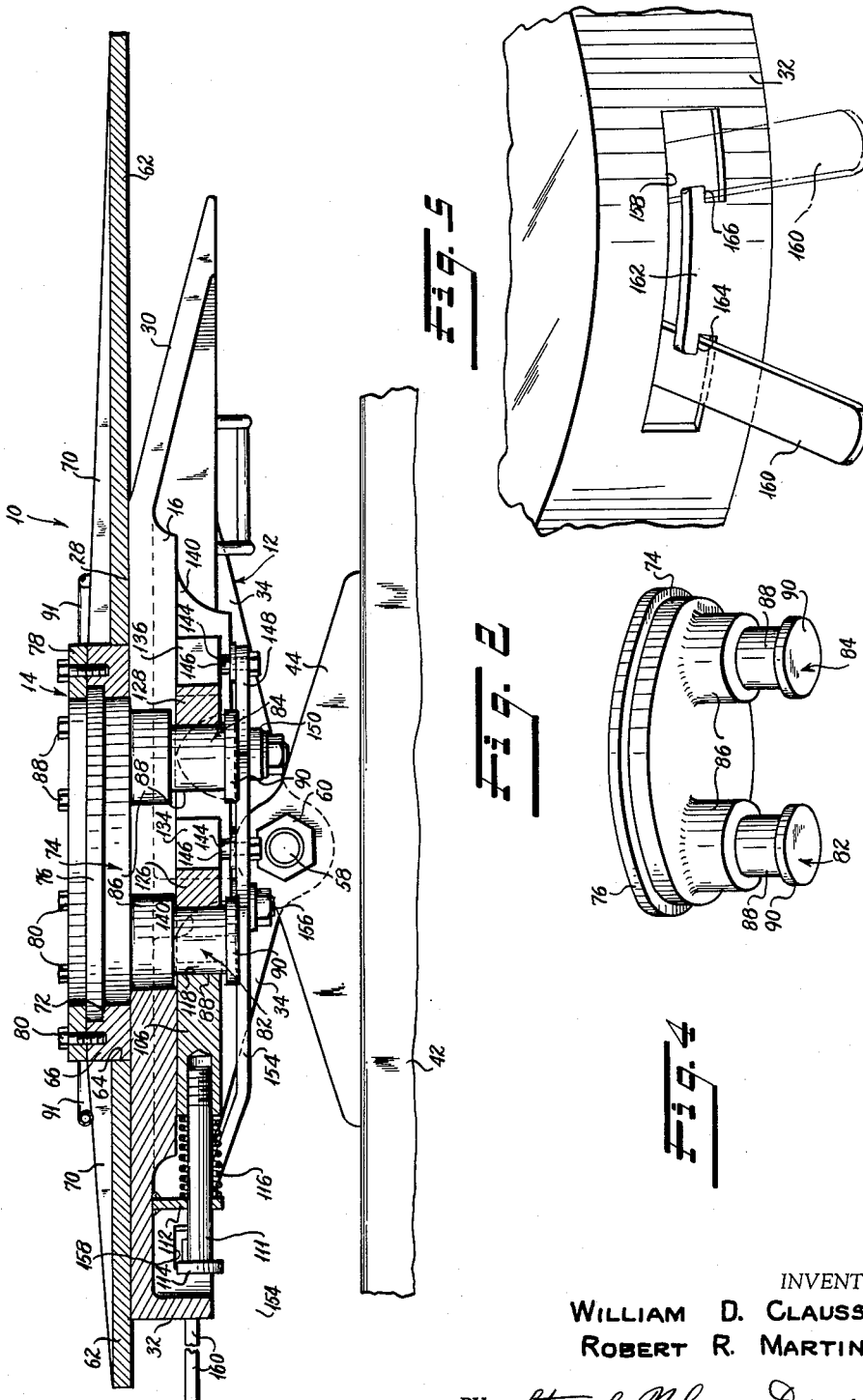
INVENTORS
WILLIAM D. CLAUSSEN
ROBERT R. MARTIN
BY *Strauch, Nolan & Diggins*
ATTORNEYS

United States Patent Office 2,738,988
Patented Mar. 20, 1956

2,738,988

TRACTOR TRAILER SAFETY COUPLING

William D. Claussen, Miami, and Robert R. Martin, North Miami Beach, Fla.

Application May 26, 1954, Serial No. 432,422

13 Claims. (Cl. 280—432)

This invention relates generally to coupling devices and more particularly to fifth wheel assemblies useful in connecting road vehicles in tandem for transmitting a locomotive force therebetween as, for example, in the case of tractor-trailer units and the like.

Inasmuch as the utility of the present invention resides primarily, but not exclusively in its application to motor trucks of the tractor-trailer type, the exemplary embodiment disclosed herein is described by way of illustration in conjunction with such a vehicle.

The basic form and structure of fifth wheel assemblies in use up to the present time is well-known. While a number of improvements have been made according to the specific types, the essential feature common to all is the use of a single king pin or draft pin usually located on the trailer vehicle and mechanism of various sorts on the tractor for releasably gripping the single draft pin to effect coupling of the two vehicles.

In the basic forms of tractor-trailer couplings presently in use difficulties are encountered in the form of parts failure resulting in accidental disengagement of the trailer from its tractor with the inevitably tragic consequences including physical injuries, loss of life, property damage and destruction of the trailer and its load. As the size of the vehicles increases, the problem becomes more acute. While various improvements have been made in the general structure and operation of fifth wheel assemblies, no construction heretofore developed eliminates the possibility of accidental disengagement due to wear or breakage of the single draft pin or cooperating coupling parts.

The present invention, in its broadest aspects contemplates a fifth wheel assembly comprising multiple draft pins, complete with individual locking and coupling mechanisms for each, so arranged that upon failure of one pin or locking and coupling mechanism the other automatically takes over and maintains an operative connection between the tractor-trailer allowing the truck to be brought safely to a halt.

Another object of the present invention is to provide a novel, and improved fifth wheel assembly.

A further object of the invention is the provision of an improved fifth wheel assembly which eliminates the possibility of accidental disengagement under normal service conditions.

A still further object is the provision of a fifth wheel assembly for tractor-trailer vehicle units which embodies multiple draft pins coupling the vehicle units without impairing the flexibility of the connection therebetween or affecting or limiting the ability of the units to assume relative positions at angles to each other as in manuevering and making turns.

Another object of the invention is to provide novel fifth wheel assemblies characterized by multiple draft pins and locking and coupling mechanisms individual to each, which assemblies may be coupled and uncoupled with an ease and rapidity equivalent to conventional fifth wheels.

A further object is to provide a novel fifth wheel assembly as characterized in the next preceding object wherein the major draft load is carried by one pin in normal operation and is automatically transferred to the other pin in event the one pin or its associated locking and coupling mechanism should fail.

Another object is to provide an improved fifth wheel assembly as characterized in the object next above wherein upon failure of the one draft pin the other draft pin can be coupled in its place allowing normal single draft pin operation of the motor truck until repairs can be made.

Another object is the provision of a novel fifth wheel assembly having the safety features described in the foregoing objects, the draft pin gripping and locking component of which can be used with conventional single pin draft plate assemblies.

These and additional objects and the manner of their accomplishment will be apparent from the following description of a preferred structural embodiment of the invention, read in conjunction with the subjoined claims and the annexed drawings, wherein like reference numerals are used to designate like parts throughout the several views and in which, Figure 1 is a bottom plan view of a fifth wheel assembly according to the present invention;

Figure 2 is a section on line 2—2 of Figure 1;

Figure 3 is a top plan view of the fifth wheel assembly shown in Figure 1;

Figure 4 is a perspective view of the draft pin disc; and

Figure 5 is a fragmentary perspective elevation of the forward end of one component of the fifth wheel assembly.

Referring to Figure 1, 10 indicates, in its entirety, a fifth wheel assembly comprising two subassembly structures: a latching component 12 and a draft plate assembly 14 (best shown in Figure 2).

The latching component 12 adapted to be mounted on the tractor vehicle as hereinafter described comprises a generally horseshoe shaped, plate-like body member 16 having its forward end rounded as at 18 in an approximately semi-circular arc, and its rearward end formed with a pair of longitudinal extensions 20, laterally spaced and having forwardly converging opposed inner edges 22 defining a generally V-shaped slot 24 therebetween. The inner or forward end of slot 24 merges into a parallel walled slot 26 provided in the central area of body member 16.

Body member 16 has a flat upper surface 28 except for extensions 20 which provide downwardly rearwardly sloping upper surfaces 30, as shown clearly in Figure 2. The underside of body member 16 is formed with a downturned peripheral flange or lip 32 extending around substantially the entire perimeter thereof and a suitable number of longitudinal ribs 34 and 36 and lateral ribs 38 and 40 all of which mutually intersect and cooperate to impart the necessary structural strength and rigidity to the body member.

Referring now to Figure 2, body member 16 is mounted on the tractor chassis side rails 42 or other suitable frame structure adjacent the rearward portion of the tractor vehicle, not shown, in the following manner. A pair of parallel trunnion brackets or pedestals (one shown in its entirety at 44, Figure 2) are provided on the respective chassis members 42 of the tractor vehicle. Brackets 44, which are parallel to, at equal distances from and on opposite sides of the horizontal centerline of the tractor, are generally in the shape of an upright triangle and are provided at their apices with coaxially aligned bores 46. Ribs 34 of body member 16 are preferably in the form of inverted triangles, as best appears in Figure 2 and the portions of peripheral flange 32 which run alongside the respective ribs 34 are similarly triangular in shape and provided with "flats" or planar surfaces 48 directly opposite similar flats 50 on the outer surfaces of ribs 34.

Flange 32 and ribs 34 are provided with coaxially aligned bores 52 and 54 through their respective flats 48 and 52. The outer ends of bores 52 are counterbored as at 56 to receive the head of trunnion bolts 58 which extend through respective bores 52, 46 and 54 on each side of the body member to mount the body member 16 on trunnion brackets 44 for rocking movement about a horizontal axis perpendicular to the center line of the tractor vehicle. Nuts 60 threaded and suitably locked on the inner ends of trunnion bolts 58 retain them against axial displacement. As hereinafter more fully explained the common axis of trunnion bolts 58 passes approximately through the turning or pivoting center of the fifth wheel assembly. With bolts 58 drawn up tight, body member 16 is normally maintained in a horizontal position so as to facilitate coupling the respective components of the fifth wheel assembly but pivots on the bolts to impart flexibility between the tractor and trailer vehicles with respect to a horizontal transverse axis.

Referring once again to Figure 2, draft plate assembly 14 comprises a flat, usually rectangular plate 62 which is rigidly secured in the conventional manner to the frame channels (not shown) or other suitable structural parts of the trailer vehicle (also not shown). Plate 62 contains a large circular aperture 64 having a bearing ring 66 which may be fitted and secured therein, as by welding or preferably, formed as an integral part of plate 62. A plurality of reinforcing ribs 68 and 70 formed on the upper surface of plate 62 extend radially outward from aperture 64 and have their inner ends permanently and fixedly secured to the outer circumference of ring 66. This construction imparts essential strength and rigidity to plate 62, allows better integration of bearing ring 66 with the plate and affords a more uniform distribution of stresses transferred to the plate from the bearing ring.

Ring 66 has a stepped internal bore defining an annular shoulder 72 therein which bore is adapted to receive rotatably a circular disc 74 having an annular peripheral flange 76 supported on shoulder 72. A flat retainer ring 78 is removably fastened to the top of bearing ring 66 as by a plurality of cap screws 80. The inner periphery of retainer ring 78 overlies flange 76 of disc 74 thus retaining the disc between itself and shoulder 72 while allowing free rotation of the disc about its own center.

Formed integrally with or secured by any suitable means to the underside of disc 74 are a pair of spaced perpendicularly depending draft or king pins 82 and 84. Draft pins 82 and 84 are preferably located on a diameter of disc 74 on opposite sides and equidistant from the center thereof. Each of the draft pins has an upper portion 86 of a diameter only slightly smaller than the width of slot 26 of the latching subassembly 12. A reduced diameter portion 88 and a retaining flange or collar 90 adjacent the lower ends of the draft pins adapt them for engagement by the locking mechanism hereinafter described.

To insure that disc 74 remains freely rotatably in service and to minimize wear on it and its associated parts, a lubrication system is provided therefor. It comprises preferably two or more radial bores 87 extending through ring 66 at circumferentially spaced locations and having their outer ends threaded to receive compression-type tube fittings 89 connecting the bores to an arcuate section of tubing 91 which serves as a lubricant manifold or distributing conduit. A T fitting 92 in manifold 91 connects it to one end of a lubricant supply conduit 94, the opposite end of which is provided with an Alemite or other type pressure lubrication fitting 96. Feed conduit 94 is suitably extended and directed to allow the supply fitting 96 to be mounted, as by a bracket member 98 at some easily accessible location in order to facilitate periodic lubrication.

From the structure thus far described it is to be understood that when the tractor and trailer vehicles are coupled, draft pins 82 and 84 are disposed in tandem relation in slot 26 as clearly shown in Figures 1 and 2 with the turning axis of disc 74 vertically intersecting the common axis of trunnion bolts 58. Locking and unlocking the draft pins to engage and disengage the latching component 12 and the draft plate assembly 14 is accomplished by means of the structure now to be described.

The underside of body member 16 of latching component 12 is provided with a generally channel-shaped guide member 100 secured thereto adjacent the inner end of slot 26 as by screw-fasteners 102 or the like and having an arcuate cut out 104 on one side. Guide member 100 axially slidably supports an abutment block or buffer 106 provided along one side with a rack gear 108 operatively meshing through cutout 104, with a pinion gear 110 rotatably mounted on the underside of body member 16.

The forward end of buffer 106, i. e., the end remote from slot 26 is provided with an extension 111, for example, in the form of a rod slidably guided in a fixed bracket 112 and having a hardened wear button 114 on its free end adapted to contact flange 32 of body member 16 to limit forward movement (to the left in Figure 2) of the buffer. A compression spring 116 encircling extension 111 and reacting between bracket 112 and buffer 106 biases the latter rearwardly (to the right) so that the rearward end of the buffer, having an arcuate surface 118 conforming to reduced diameter portions 88 of draft pins 82 and 84, normally projects beyond the inner end of slot 26.

A pair of suitable brackets 120 and 122 secured to the underside of body member 12 guidingly support a straight rack 124 for sliding movement alongside and parallel to slot 26. The forward end of rack 124 meshes with pinion 110, as clearly appears in Figure 1. A pair of arcuate cantilever latch arms 126 and 128 are pivotally secured at one end as by pintle bolts 130 at spaced points alongside slot 26 between the slot and rack 124. As will more fully appear as this description proceeds, the latch arms function in one position to hold draft pins 82 and 84 in slot 26 with the foremost pin carrying the major load under normal operating conditions. Accordingly, the distance between the pivotal centers of latch arms 126 and 128 and/or the configuration of the arms is such that this load distribution is accomplished. The free ends of arms 126 and 128 are formed with arcuate camming surfaces 129 for a purpose hereinafter appearing.

The pivoted ends of latch arms 126 and 128 are provided with circular gear segments 132 concentric with pintle bolts 130 and meshing with rack 124. From the structure thus far described it will be seen that rearward sliding of rack 124 jointly and equally pivots latch arms 126 and 128 clockwise to the position shown in Figure 1, in which position they extend across slot 26 behind the draft pins 82 and 84 therein. When the rack moves forwardly, latch arms 126 and 128 turn counterclockwise to a position generally parallel to slot 26 thus allowing the draft pins 82 and 84 to be withdrawn from the slot.

Latch arms 126 and 128 are locked in the draft pin retaining position by respective locking dogs 134 and 136 engaging in notches 138 on the arms. Dogs 134 and 136 are slidably mounted for linear sliding movement substantially perpendicular to the axis of slot 26, each by a pair of guide brackets 140 formed integrally on the underside of body member 16 or secured thereto as by screws 142. The brackets 140 of each pair are formed and spaced so as to provide a slot 144 therebetween which accommodates passage of pivot pins 146 connecting the respective dogs to a V-shaped yoke 148 for concomitant operation thereby.

Yoke 148 is pivotally secured at its apex to one end of a link 150 having an axial slot 152 in its opposite end. An operating lever 154 is pivotally mounted on the body member 16 as at 156. One end of lever 154 extends forwardly through a guide slot 158 in the forward portion of depending flange 32 as best shown in Figure 5 and at its extreme end is provided with a handle portion 160 adapted for manual manipulation to pivot the lever about pivotal mounting 156 and between the solid and broken line position shown in Figures 1 and 5.

Referring to Figure 5, guide slot 158 is provided midway between its ends with a locking formation 162 extending part way across the slot and undercut at each side to form retaining notches 164 and 166 in which lever 154 may be selectively engaged to lock it in either its solid line or broken line positions. Lever 154 is either sufficiently flexible or enough play is provided in its pivotal mounting 156 to allow it to be moved transversely of slot 158 when disengaged from notches 164 or 166 as the case may be so that it clears the locking formation in movement from one position to the other.

Referring back to Figure 1, the opposite end of lever 154 with respect to handle portion 160 forms a lost motion pivotal connection with link 150 by means of the bolt assembly 168 working in slot 162.

The ends of locking dogs 134 and 136 remote from slot 26 carry extension rods 170 passing through suitable depending guide brackets 172 formed on the underside of body member 16 and having stop collars 174 pinned to their free ends. The locking dogs are normally biased toward slot 26 by compression springs 176 encircling rods 170 and reacting against brackets 172, stop collars 174 limiting the inward movement of the dogs under the influence of the springs.

From the foregoing description, it will be understood that the fifth wheel assembly operates to accomplish the objects of the invention in the following manner.

With the latching component 12 mounted on the tractor vehicle and the draft plate assembly 14 on the trailer and lever 154 held in its solid line position by engagement in notch 164 of locking formation 162, coupling is effected by backing the tractor toward the trailer so that draft pins 82 and 84 enter space 24 between extensions 20 of body member 16. If the pins are not perfectly aligned with slot 26, they will contact the converging surfaces 22 causing disc 74 to rotate about its center until the pins assume a position of proper alignment.

Before pins 82 and 84 enter slot 26, that is, with the latching component in disengaged or inoperative position, spring 116 holds buffer 106 in its extreme rearward position. In assuming this position it rotates pinion 110 counterclockwise, driving rack 124 to its extreme forward position so that latch arms 126 and 128 are swung clear of slot 26 to their extreme counterclockwise positions in which they are roughly parallel to the slot.

As pins 82 and 84 enter slot 26 they sequentially cam against the projecting ends of locking dogs 136 and 134 pushing them back against the force of springs 170 as permitted by the lost motion connection between link 150 and lever 154. Springs 170 return the dogs to their normal positions once the pins have moved past. As the foremost draft pin 82 approaches the inner end of slot 26, it contacts the arcuate end 118 of buffer 106 moving the buffer forwardly against the pressure of spring 116, thus rotating pinion 110 clockwise which drives rack 124 to the right swinging latch arms 126 and 128 clockwise. The rounded free ends 129 of the latch arms cam against the locking dogs 134 and 136 respectively forcing them back against their biasing springs 176 until the arms are in latching position as shown in Figure 1 whereupon the dogs snap back in place engaging notches 138 and positively locking the arms in position.

Thus coupling of the tractor and trailer vehicles is quickly and easily accomplished. The turning center between the tractor and trailer is the center of disc 74 which rotates relative to bearing ring 66 and retainer 80 to allow the tractor and trailer vehicles to assume relative positions at angles up to about 90° between their longitudinal axis.

As already explained, the foremost draft pin 82 carries the load in normal operation. It is snugly gripped between the buffer 106 at the front and arm 126 at the back. When the truck decelerates, forward movement of pin 82 is cushioned by spring 116 so that sudden shearing forces are eliminated. In moving the buffer 106 forwardly to compress the spring, pinion 110 is rotated clockwise driving rack 124 to the right and turning latch arms clockwise so that no slack is introduced into the connection between pin 82, buffer 106 and arm 126.

In event the load bearing pin 82, its latch arm 126, or dog 134 should fail while the tractor is pulling the trailer, pin 84 immediately takes up the load. The fact that the rear pin is carrying the load will be quickly apparent to the driver upon braking of the "rig" because of the slack in the coupling, thus warning him to come to a halt.

After the "rig" has been stopped, if the failure of the forward pin is the only damage, i. e., if the forward latching mechanism is in operating condition, the trailer can be recoupled with the rear pin 84 in the forward latching position. So coupled, the truck may be operated in the normal manner with as much safety as conventionally coupled combinations. The only change in operating characteristics is that the turning center is moved forwardly (from the center of disc 74 to the center of pin 84 coupled in the forward position) and, of course, the additional safety provided by the invention is no longer present.

Uncoupling of the tractor and trailer is accomplished with ease and rapidity by moving lever 154 to its broken line position (Figures 1 and 5) and locking it in notch 166 of locking formation 162. Thus dogs 134 and 136 are jointly withdrawn from slot 26 which allows latch arms 126 and 128 to turn counterclockwise as the tractor is drawn away from the trailer.

While pin 82 is depicted in the drawings as the primary draft pin, it will be appreciated that revolving disc 74 through 180° will automatically make draft pin 84 the primary draft pin. However, since the two pins are equidistantly spaced from the center of disc 74 along a diameter thereof, it is immaterial which of the two pins is employed as the primary draft pin.

From the foregoing description of a single exemplary embodiment it will be seen that fifth wheel assemblies have been disclosed which accomplish all the objects of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fifth wheel assembly, a body member having a slot therein open at one end, a plate member mounted for rotary movement about an axis perpendicular thereto and having a pair of spaced, depending draft pins thereon adapted to be received in axial alignment in said slot, and means, associated with said body member and individual to each of said draft pins, operable to lock said draft pins in said slot whereby said body member and plate member are operatively coupled when said draft pins are locked in said slot and respectively remain so coupled even upon failure of one of said draft pins.

2. In a fifth wheel assembly as defined in claim 1, said axis of rotary movement of said plate member being located midway between said draft pins.

3. In a fifth wheel assembly for operatively coupling a tractor vehicle and a trailer vehicle in tandem relation, a plate member adapted to be mounted horizontally on one of said vehicles for rotary movement about a vertical axis and having a pair of spaced perpendicularly depending draft pins thereon in common alignment with said axis; a body member adapted to be mounted on the other of said vehicles and having a substantially horizontal slot therein open at one end toward said one vehicle, said slot being adapted to slidably receive said draft pins in tandem therein; and means, associated with said body member and individual to each of said draft pins, operable to individually lock said draft pins in said slot.

4. A fifth wheel assembly for operatively coupling a tractor vehicle and a trailer vehicle in tandem comprising: a plate member mounted in a substantially horizontal plane on the forward end of said trailer vehicle for rotary movement about an axis perpendicular to said plate member; a pair of spaced draft pins depending perpendicularly from the underside of said plate member, said draft pins being equally spaced from and disposed on diametrically opposite sides of said perpendicular axis; a body member fixedly mounted on the rearward end of said tractor vehicle for tilting movement about a horizontal axis perpendicular to the longitudinal axis of said tractor vehicle, said body member containing a slot disposed in a horizontal plane and having a longitudinal axis approximately coincident with the longitudinal axis of said tractor, said slot being open at its rearward end; and means mounted on said body member jointly operable to lock said draft pins individually in said slot in tandem relation.

5. A fifth wheel assembly for operatively coupling a tractor vehicle and a trailer vehicle in tandem comprising: a draft plate assembly mounted horizontally adjacent the forward end of said trailer vehicle, said draft plate assembly comprising a circular disc mounted for rotation about its center in a substantially horizontal plane and having a pair of perpendicularly depending spaced draft pins on the underside thereof located on a diameter of said disc equidistant from its center; a body member mounted adjacent the rearward end of said tractor vehicle and having a rearwardly open horizontal slot therein adapted to receive said draft pins in tandem; a buffer member mounted on said body member adjacent the forward end of said slot for sliding movement in alignment with said slot; means normally biasing said buffer member rearwardly to a limit position wherein the rearward end thereof projects beyond the forward end of said slot; a pair of latch arms having corresponding ends mounted on said body member at spaced points along one side of said slot for limited pivotal movement about respective axes substantially perpendicular to the plane of said slot to and from a first limit position in which said arms extend transversely across said slot and a second limit position in which said arms are generally parallel to said slot; gear means mounted on said body member and operatively connecting said latch arms to said buffer member so that with said buffer member in its said limit position said latch arms are in their said second limit positions and movement of said buffer member forwardly from its limit position jointly pivots said latch arms toward their said first limit positions whereby, upon entry of said draft pins into said slot and forcible contact of the foremost of said draft pins with said buffer member said latch arms are concomitantly moved toward their second limit positions behind each of said draft pins; lock means individual to each of said latch arms normally operative to engage and individually lock said latch arms against movement from their second limit position; and means selectively operable to disengage said lock means from said latch arms.

6. The fifth wheel assembly defined in claim 5 wherein said lock means and selectively operable means comprise a pair of locking dogs mounted for sliding movement transversely of said slot on the opposite side thereof with respect to the pivotally mounted ends of said latch arms, means individual to each locking dog resiliently biasing it toward latch arm engaging position, a yoke member extending transversely to the line of movement of said locking dogs and having respective ends pivotally connected thereto, and a manually operable lever pivotally connected to said yoke member operative to jointly move said locking dogs against said resiliently biasing means.

7. A draft pin assembly for vehicles, comprising a circular plate, means for mounting said plate adjacent one end of said vehicle for rotation about a vertical axis through the center of said plate and a pair of draft pins depending perpendicularly from the underside of said plate, said draft pins being located on a diameter of said plate at equal distances from and on opposite sides of the center of said plate.

8. A draft pin assembly for vehicles, comprising a plate adapted to be fixedly secured in a horizontal attitude adjacent one end of said vehicle; a circular aperture in said plate having its center approximately on the center line of the vehicle on which it is mounted; a bearing ring in said aperture having a stepped internal bore comprising an upper portion and a lower portion of relatively smaller diameter than said upper portion, the juncture of said upper and lower portion defining an annular, concentric shoulder in said bore; a circular disc concentrically freely rotatably disposed in said bore, said disc having an annular flange on its periphery supported on the shoulder in said bore; a retainer ring removably secured on the upper surface of said bearing ring, its inner circumferential portion overlying the outer circumferential portion of said disc whereby the latter is rotatably retained between said shoulder and retainer ring; and a pair of spaced perpendicularly depending draft pins on the underside of said disc, said draft pins being located on a diameter of said disc and equidistant from the center thereof.

9. The draft plate assembly defined in claim 8 including a lubrication system for the bearing surfaces thereof comprising lubricant bores in said bearing ring extending between the inner and outer circumferences thereof, a lubrican manifold connected in flow communication with the outer ends of said lubricant bores, and a lubricant supply conduit connected at one end to said manifold and having its opposite end located at an accessible location for the injection of lubricating material.

10. A tractor trailer hitch plate comprising a body member having a rearwardly opening slot therein and depending mounting formations at opposite sides providing axially aligned journal openings adapted to receive opposite axially aligned journanl pins; a spring biased buffer element slidably mounted on said body member forwardly of the closed end of said slot with one end extending rearwardly beyond said closed end of said slot in underlying relation to said slot and having rack teeth along one side edge; a pinion gear journalled on the underside of said body member adjacent said buffer member in geared engagement with said rack teeth; latch lever means journalled on the underside of said body member rearwardly of said pinion gear and having a gear segment concentric with its journal axis disposed in rearward alignment with the segment of said pinion remote from said rack teeth of said buffer element; a rack bar slidably mounted on the underside of said body member with its rack teeth meshing with the teeth of said pinion and gear segment and adapted upon opposite sliding movements of said buffer member to be axially slidably moved in opposite directions by said pinion gear so as to drive said gear segment in opposite directions to swing said latch lever means back and forth between its non-latching position generally parallel to said slot and its latching position transversely of said slot; and locking means spring biased to a locking position overlying said slot in position to engage behind the free end of said latch lever means to prevent movement of said latch lever means from latched to non-latched position until said locking means is manually released.

11. The hitch plate of claim 10 wherein said latch lever means comprises a pair of levers arranged in rearward spaced relation to each other and said pinion gear and said locking means comprises a pair of locking pins transversely slidably mounted with respect to said slot in relative rearwardly spaced relation to respectively cooperate with said pair of levers.

12. A tractor trailer hitch plate comprising a body member having a centrally disposed stepped bore of substantial diameter therein opening into both faces of said body member; a disk element having a body portion of a diameter to rotatably fit in the smaller diameter portion of said stepped bore and an annular flange at one end of a diameter to rotatably fit in the larger diameter portion of said stepped bore; a retainer ring removably secured to one face of said body member with its inner marginal edge overlapping said annular flange to retain said disk element in rotatable assembly in said stepped bore; and draft pin means extending away from the other end of said disc element.

13. The hitch plate of claim 12 wherein said draft pin means comprises a pair of draft pins spaced along a diameter of said disc element in equispaced relation to the axis of said disc element.

References Cited in the file of this patent

UNITED STATES PATENTS

| | | |
|---|---|---|
| 1,981,233 | Harris | Nov. 20, 1934 |
| 2,652,262 | Sherry | Sept. 15, 1953 |
| 2,656,195 | Martin | Oct. 20, 1953 |

FOREIGN PATENTS

| | | |
|---|---|---|
| 987,290 | France | Apr. 11, 1951 |
| 12,392 of 1884 | Great Britain | Sept. 15, 1884 |